United States Patent
Hintzer et al.

(10) Patent No.: US 12,018,105 B2
(45) Date of Patent: Jun. 25, 2024

(54) FLUOROPOLYMERS WITH VERY LOW AMOUNTS OF A FLUORINATED ALKANOIC ACID OR ITS SALTS

(71) Applicant: 3M INNOVATIVE PROPERTIES COMPANY, St. Paul, MN (US)

(72) Inventors: Klaus Hintzer, Kastl (DE); Florian D. Jochum, Heidesheim am Rhein (DE); Herbert Koenigsmann, Burgkirchen (DE); Jens Schrooten, Muehldorf am Inn (DE); Tilman C. Zipplies, Burghausen (DE); Karl D. Weilandt, Afton, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 899 days.

(21) Appl. No.: 17/053,985

(22) PCT Filed: May 8, 2019

(86) PCT No.: PCT/IB2019/053782
§ 371 (c)(1),
(2) Date: Nov. 9, 2020

(87) PCT Pub. No.: WO2019/215636
PCT Pub. Date: Nov. 14, 2019

(65) Prior Publication Data
US 2021/0230328 A1 Jul. 29, 2021

Related U.S. Application Data

(60) Provisional application No. 62/712,827, filed on Jul. 31, 2018, provisional application No. 62/712,840, filed on Jul. 31, 2018.

(30) Foreign Application Priority Data

May 9, 2018 (GB) ...................... 1807544

(51) Int. Cl.
*C08F 214/26* (2006.01)
(52) U.S. Cl.
CPC ................ *C08F 214/262* (2013.01)
(58) Field of Classification Search
CPC .................................. C08F 214/262
See application file for complete search history.

(56) References Cited

U.S. PATENT DOCUMENTS

| | | |
|---|---|---|
| 3,752,789 A | 8/1973 | Khan |
| 4,214,060 A | 7/1980 | Apotheker |
| 4,439,385 A | 3/1984 | Kuhls |
| 4,513,128 A | 4/1985 | Uschold |
| 4,745,165 A | 5/1988 | Arcella |
| 4,831,085 A | 5/1989 | Okabe |
| 5,285,002 A | 2/1994 | Grootaert |
| 5,463,021 A | 10/1995 | Beyer |
| 6,114,452 A | 9/2000 | Schmiegel |
| 6,703,461 B1 | 3/2004 | Tanaka et al. |
| 7,671,112 B2 | 3/2010 | Hintzer |
| 8,604,137 B2 | 12/2013 | Grootaert |
| 2004/0024134 A1 | 2/2004 | Grootaert |
| 2004/0147698 A1 | 7/2004 | Tanaka et al. |
| 2007/0015937 A1 | 1/2007 | Hintzer |
| 2007/0149733 A1 | 6/2007 | Otsuka |
| 2008/0087627 A1 | 4/2008 | Zuffa et al. |
| 2008/0287627 A1 | 11/2008 | Noguchi |
| 2010/0120988 A1 | 5/2010 | Komori et al. |
| 2011/0207890 A1 | 8/2011 | Terata |
| 2016/0347895 A1* | 12/2016 | Morikawa ................ C08F 2/24 |

FOREIGN PATENT DOCUMENTS

| | | |
|---|---|---|
| CN | 1293681 A | 5/2001 |
| CN | 1671757 A | 9/2005 |
| CN | 101702910 A | 5/2010 |
| EP | 1 097 948 A1 | 5/2001 |
| EP | 1097948 A1 | 5/2001 |
| EP | 1845116 | 10/2007 |
| EP | 1997795 | 12/2008 |
| EP | 1155055 | 4/2009 |
| EP | 2 138 539 A1 | 12/2009 |
| EP | 2138539 A1 | 12/2009 |

(Continued)

OTHER PUBLICATIONS

International Search Report for PCT International Application No. PCT/IB2019/053782, mailed on Aug. 19, 2019, 5 pages.
Matsuda et al., Radiation-induced Emulsion Copolymerization of Tetrafluoroethylene with Propylene, pp. 1-15 (translation pp. 1-29), Mar. 1974, Japan Atomic Energy Research Institute.
Kertes et al., Extraction Chemistry of Low Molecular Weight Aliphatic Alcohols, Chemical Reviews, vol. 87, No. 4, 1987, pp. 687-710, American Chemical Society.
Hazardous Substance Fact Sheet, pp. 1-6, Mar. 2010, New Jersey Department of Health.

(Continued)

*Primary Examiner* — Robert D Harlan
(74) *Attorney, Agent, or Firm* — Thomas M. Spielbauer

(57) ABSTRACT

Method of reducing the amount of a fluorinated acid or its salts from a fluoropolymer, the method comprises: (i) providing a composition containing particles of the fluoropolymer, (ii) contacting the fluoropolymer particles with a treatment composition comprising at least one organic liquid; and, optionally, further comprising (iii) isolating, washing and subjecting the fluoropolymer to drying treatment, and wherein the fluoropolymer contains units derived from tetrafluoroethene (TFE) and is selected from the group of fluoroelastomers and the group of fluoropolymers having a melting point of less than 150° C. Also provided are fluoropolymer and compositions containing such polymers that are essentially free of fluorinated acids and their salts.

18 Claims, No Drawings

(56) References Cited

FOREIGN PATENT DOCUMENTS

| | | | | |
|---|---|---|---|---|
| EP | 2601226 | 4/2020 | | |
| JP | 2005-037777 | 2/2005 | | |
| JP | 2007-099624 | 4/2007 | | |
| WO | 2005107917 A1 | 11/2005 | | |
| WO | 2007011633 A1 | 1/2007 | | |
| WO | WO 2007-018783 | 2/2007 | | |
| WO | WO 2007-116037 | 10/2007 | | |
| WO | WO 2007-120348 | 10/2007 | | |
| WO | WO-2007120348 A1 * | 10/2007 | ............. | C08F 14/18 |
| WO | WO 2014-088820 | 6/2014 | | |
| WO | WO 2015-080002 | 6/2015 | | |

OTHER PUBLICATIONS

A. S. Kertes et al., Extraction Chemistry of Low Molecular Weight Aliphatic Alcohols, pp. 687-710, 1987, American Chemical Society, Chemical Reviews, vol. 87, No. 4, Department of Chemical Engineering and Lawrence Berkeley Laboratory, University of California, Berkeley, California 94720.

* cited by examiner

FLUOROPOLYMERS WITH VERY LOW AMOUNTS OF A FLUORINATED ALKANOIC ACID OR ITS SALTS

CROSS REFERENCE TO RELATED APPLICATIONS

This application is a national stage filing under 35 U.S.C. 371 of PCT/IB2019/053782, filed May 8, 2019, which claims the benefit of Great Britain Application No. 1807544.0, filed May 9, 2018 and Provisional Application No. 62/712,827, filed Jul. 31, 2018 and Provisional Application No. 62/712,840, filed Jul. 31, 2018, the disclosure of which is incorporated by reference in their entirety herein.

FIELD

The present disclosure relates to fluoropolymers containing only very low amounts of fluorinated alkanoic acids and their salts, and to processes of making them.

BACKGROUND

Fluoropolymers, in particular fluoropolymer with a high content of tetrafluoroethene (TFE, or also referred to as "tetrafluoroethylene"), have achieved outstanding commercial success due to their chemical and thermal inertness. Typical end-use applications of the polymers include, for example, seals for engines, seals in oil-well drilling devices, and sealing elements for industrial equipment that operates at high temperatures or in a chemically aggressive environment.

The outstanding properties of the fluoropolymers are largely attributable to the stability and inertness of the copolymerized perfluorinated monomer units that make up the major or entire portion of the polymer backbones in these compositions. Such monomers typically include tetrafluoroethene and at least one other perfluorinated alpha-olefin.

Fluoropolymers are typically prepared by aqueous emulsion polymerization using fluorinated acid emulsifiers. Perfluorinated alkanoic acids have been used in the past, but they are poorly biodegradable. Therefore, their use is desirably avoided or reduced or expensive purification methods are used to contain or recycle these emulsifiers. For example methods have been developed to remove such emulsifiers from aqueous fluoropolymer dispersions, for example by anion exchange as described in EP 1 155 055 B1. However, this method requires non-ionic emulsifiers as stabilizers. Depending on the end-use application, non-ionic emulsifiers may lead to undesired wetting problems and uptake of moisture and they may have to be removed from the isolated polymers. This may be challenging for polymers with no or low melting points because they melt at temperatures which are required to thermally degrade non-ionic emulsifiers.

Methods have been developed to prepare fluoropolymers without using perfluorinated alkanoic acid emulsifiers, for example by using alternative fluorinated emulsifiers. Such alternative emulsifiers are described, for example, in U.S. Pat. No. 7,671,112. Other methods for making fluoropolymers have been reported that do not require fluorinated emulsifiers at all, as for example described in WO2007/120348.

Therefore, there is a need for a method to remove these emulsifiers that can be used as an alternative or in addition to the anion exchange resin method and that does not require the presence of non-ionic emulsifiers.

Moreover, it has been found that despite avoiding perfluorinated alkanoic acid emulsifiers, such acids may still be generated as side products in the course of aqueous radical polymerizations—although in low amounts. Such acids may be found as extractables in the resulting coagulated fluoropolymer reaction products. The formation of such acids is believed to be the result of a chemical side reaction that occurs during the radical polymerization reaction, in particular, when perfluorinated vinyl ethers are used as comonomers.

Therefore, there is a need for providing fluoropolymers with low amounts of extractable fluorinated emulsifier acids.

Therefore, there is a need for an alternative technology for removing fluorinated acids from fluoropolymer compositions. Desirably the methods for removing fluorinated emulsifier acids and their salts that can be used as alternatives or in addition to the anion-exchange method.

There is also a need to provide fluoropolymers, in particular fluoropolymers with low melting points and with perfluorinated vinyl ethers as comonomers, that have very low amounts of fluorinated alkanoic acids or their salts.

SUMMARY

Therefore, in one aspect there is provided a method of reducing the amount of a fluorinated acid or its salts from a fluoropolymer, the method comprises
  (i) providing a composition containing particles of the fluoropolymer,
  (ii) contacting the fluoropolymer particles with a treatment composition comprising at least one organic liquid;
and, optionally, further comprising (iii) isolating, washing and subjecting the fluoropolymer to drying treatment, and wherein the fluoropolymer contains units derived from tetrafluoroethene (TFE) and is selected from the group of fluoroelastomers and the group of fluoropolymers having a melting point of less than 150° C.

In another aspect there is provided a fluoropolymer having an amount of an extractable fluorinated acid and its salt of less than 2000 ppb, preferably less than 1000 ppb and more preferably less than 100 ppb (based on the weight of the fluoropolymer), wherein the fluorinated acid corresponds to the general formula:

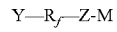

Y—R$_f$—Z-M wherein Y represents hydrogen, Cl or F; R$_f$ represents a divalent linear or branched or cyclic perfluorinated or partially fluorinated saturated carbon chain having 4 to 18 carbon atoms wherein the carbon chain may be interrupted once or more than once by a catenary oxygen atom; Z represents an acid group, for example a —COO$^-$ or a —SO$_3^-$ acid group, and M represents a cation including H$^+$, and wherein the fluoropolymer contains units derived from tetrafluoroethene (TFE) and is selected from fluoroelastomers and from thermoplastic fluoropolymers having a melting point of less than 150° C.

In yet another aspect there is provided a composition comprising the above fluoropolymer.

In a further aspect there is provide a composition obtainable by curing the above composition.

Particular embodiments of the present disclosure are described in the description and in the dependent claims.

DETAILED DESCRIPTION

Before any embodiments of this disclosure are explained in detail, it is to be understood that the disclosure is not limited in its application to the details of construction and the arrangement of components set forth in the following description. The invention is capable of other embodiments and of being practiced or of being carried out in various ways. Also, it is to be understood that the phraseology and terminology used herein is for the purpose of description. Contrary to the use of "consisting", the use of "including," "containing", "comprising," or "having" and variations thereof is meant to encompass the items listed thereafter as well as additional items. The use of "a" or "an" is meant to encompass "one or more". Any numerical range recited herein describing a physical property or a concentration is intended to include all values from the lower value to the upper value of that range and including the endpoints. For example, a concentration range of from 1% to 50% is intended to be an abbreviation and to expressly disclose the values between the 1% and 50%, such as, for example, 2%, 40%, 10%, 30%, 1.5%, 3.9% and so forth.

Unless indicated otherwise the total amounts of ingredients of a composition expressed as "percentage by weight", "% by weight" or "wt. %" or similar add up to 100%, i.e., the total weight of the composition is 100 wt. % unless stated otherwise. Likewise, unless indicated otherwise the total amounts of ingredients of a composition expressed as percentage by mole (mol %) or similar add up to 100% and the total amount of moles of the composition is 100% by mole unless stated otherwise.

Treatment:

The inventors have found that the amount of fluorinated acid emulsifiers and their salts can be reduced from compositions containing one or more fluoropolymers by treating fluoropolymer particles with a composition containing one or more organic liquids (also referred herein as "treatment composition"). The methods provided herein allow to produce or provide fluoropolymers with very low amounts of extractable fluorinated emulsifier acids and their salts, in particular, but not limited to, $C_8$-acids and/or $C_9$-$C_{14}$ acids.

The amount of fluorinated emulsifier acids or salts thereof in a fluoropolymer is determined by extraction of the acids from the polymer (also referred to herein as "extractable fluorinated emulsifier acids" or "extractable fluorinated acids"). The polymer sample is extracted with methanol and the content of emulsifier acids or salts thereof in the methanol extract is determined by HPLC-coupled mass spectrometry. The extraction is done by adding 3 ml methanol to 1 g fluoropolymer sample and stirring the mixture for 16 h@250 rpm and 50° C.

Typically, the at least one fluoropolymer subjected to the treatment composition is provided as composition containing the fluoropolymer. This may be a solution or a dispersion, emulsion or suspension of fluoropolymer particles. Preferably, the composition is an aqueous dispersion or emulsion of fluoropolymer particles. Preferably, the composition has a fluoropolymer content of from about 6 to 65% by weight, typically from 12 to 45% by weight. Preferably, the fluoropolymer is present in the composition as particles having a particle size of less than 2,000 nm, for example an average particle size of less than 400 nm. Preferably, the composition containing the fluoropolymer is the reaction product from an aqueous polymerization reaction producing the fluoropolymer, optionally including work up steps. At the end of such polymerization reactions and work-up procedures, the fluoropolymers typically are present as particles dispersed or suspended in the aqueous reaction medium, for example present as emulsion (for example, when one or more emulsifiers were used in the polymerization). The composition comprising the one or more fluoropolymers may contain one or more perfluorinated acids or its or their salts even if no such acid or its salt had been added to the polymerization reaction. This believed may occur when using vinyl ethers as comonomers and/or when using fluorinated organic reaction initiators.

The reaction product from the aqueous polymerization is typically an aqueous dispersion or emulsion of the polymer particles. It may contain the polymer in amounts of from about 10 to 45% by weight. The polymer particles typically have a particle size of less than 2,000 nm, for example an average particle size of less than 400 nm. The compositions may contain one or more fluorinated emulsifier, and, in particular, perfluorinated alkanoic acids or their salts (referred to herein in the following also as "PFAAs") in amounts of up to 1,000 ppm or up to 10,000 ppm based on the total weight of the composition or even higher amounts—before having been treated with the treatment composition according to the present disclosure. Also, dispersions that have been treated by the anion-exchange method may be used and purified further by the methods of the present disclosure—if the presence of non-ionic emulsifiers resulting from anion-exchange methods can be tolerated, or for example for removing sulfonic acid emulsifiers as will be described below. In a preferred embodiment, the fluoropolymer compositions used in the present disclosure have not been subjected to an anion-exchange method using stabilizing non-ionic emulsifiers.

The compositions comprising the one or more fluoropolymers may be brought to a lower pH, preferably to below pH 4.0. Adjusting the pH is preferably carried out using one or more mineral acids, e.g. HCl, or $HNO_3$ to avoid introducing metal cations. Metal cations are preferably avoided as metal cations may present undesired impurities in many end-use applications. The compositions may be essentially free of metal cations, in particular of Na, K, Mg, and Al cations, but generally of alkaline earth metal ions and alkali metal ions in general and may contain them in amounts of less than 20 ppm or less than 10 ppm or even less than 1 ppm. The level of alkaline- and alkaline-earth-ions (Na, K, Li, Ca, Mg, Ba) and Al may be individually below 1 ppm and in total below 4 ppm. Other ions like Fe, Ni, Cr, Cu, Zn, Mn, Co may be in total less than 4 ppm. The pH adjustment, if necessary, may be carried out before subjecting the fluoropolymer to the treatment composition containing the organic liquid(s) or may be carried out simultaneously with subjecting the fluoropolymer composition to the treatment composition. Preferably the addition of the acid leads to the coagulation of the polymer particles or contributes to the coagulation of the particles.

The treatment composition comprises at least one organic liquid. The liquid preferably contains at least one carbon atom and at least one C—H (carbon-hydrogen) bond. Suitable liquids include those having a boiling point of from 30° C. to 200° C., preferably 40° C. to 180° C. and more preferably from 50° C. to 150° C. Preferably, the organic liquids have a melting point below 0° C. Suitable organic liquids include hydrocarbons. The hydrocarbons may be linear, branched, cyclic and may contain combinations thereof. The organic liquid may be aromatic or non-aromatic, e.g. aliphatic. Preferred liquids include saturated linear, branched or cyclic hydrocarbons or mixtures thereof, including gasoline and kerosene. Other preferred organic liquids include hydrocarbons selected from hydrocarbons that contain oxygen-ether or ketone groups or combinations thereof, for example hydrocarbon ethers, hydrocarbon ether-ketones, hydrocarbon esters, hydrocarbon ketones, hydrocarbon ketone esters and combinations thereof and including homologues where one or more hydrogen atom has been replaced with a halogen atom, preferably fluorine or chlorine atom or combinations thereof. Other suitable organic liquids include aromatic liquids including xylene, benzene and toluene including fluorinated and/or chlorinated analogues and derivatives. Further suitable liquids include fluorinated hydrocarbons and fluorinated hydrocarbons that may contain further functional groups for example ether groups, nitrogen groups, hydroxy groups, ester groups and combinations thereof. Preferred liquids include gasoline and halogenated liquids including chlorinated liquids and hydrofluoroethers.

In one embodiment the organic liquid is a hydrocarbon that may, optionally, contain one or more functional groups selected from halogen atoms, ether groups, carboxylate ester groups, phosphoric acid ester groups, phosphonic acid ester groups, sulfonic acid ester groups, sulfuric acid ester groups, nitrile groups, ketone groups, carbon-carbon double bonds, carbon-carbon triple bonds, hydroxy groups, nitrogen-containing functional groups other than nitrile groups, sulfoxide groups, anhydride groups and combinations thereof.

Preferably, the liquid is not miscible with water at ambient conditions. Miscibility is the property of substances to mix forming a homogeneous solution and is recorded in textbooks or reference books known to the person skilled in the art. If necessary, miscibility can be tested, for example, when 20 ml of the organic liquid is mixed with 20 ml of distilled water in a 100 ml beaker and stirred by a magnetic stirrer (100 rpm) for 20 minutes at ambient conditions. If 10 minutes after the stirrer had been turned off at least two phases have formed that are visible to the unaided eye, the organic liquid can be regarded as not miscible with water. Preferably, the liquids do not lead to swelling of the fluoropolymer or to a swelling of less than 5%, preferably less than 2%. To test the swelling 100 g of the fluoropolymer is kept in the liquid for 24 h at 20° C. The polymer is removed from the liquid by filtering off the liquid and drying the fluoropolymer at room temperature for 2 h. The fluoropolymer is weighed and the weight increase in % corresponds to the swelling in %.

For treatment of perfluorinated fluoropolymers nonpolar liquids are preferred while for partially fluorinated polymers more polar liquids may be preferred, in particular with increasing amounts of hydrogen bonds in the polymer, liquids with increasing polarity may be preferably used.

The treatment composition may also contain water and may in fact be a dual phase or a multi-phase composition. Preferably, the treatment composition contains water and one or more salt, preferably an aqueous salt solution. More preferably, the composition containing the fluoropolymer is the reaction product of the polymerization reaction to produce the fluoropolymer or a dispersion of that reaction product obtained after some work-up steps, i.e. the composition is a dispersion or emulsion of fluoropolymer particles. Subjecting the composition with the treatment composition is carried out such that the fluoropolymer particles coagulate. This may be achieved, for example, by using a treatment composition that contains salts and thus increase the salt content to a level that leads to coagulation. Alternative, the pH of the composition may be reduced by using a treatment composition containing a mineral acid, preferably an aqueous solution of the mineral acid. The concentration of acid or salts in the treatment composition and the volume of the treatment composition may be chosen such that dispersed fluoropolymer particles in the composition containing the fluoropolymer coagulate during the treatment step. Stirring and applications of appropriate temperatures and pressures may be used to achieve or support the coagulation.

Preferably, the treatment composition further contains water, preferably as a distinct separate phase. For example, the volume ratio of water to organic liquid of the treatment composition might be such that there is an excess of organic liquid. Typical ranges include a volume ratio of water to organic liquid from 1:100 to 100:1; preferably from 1:10 to 10:1. Typically, the total amount (weight) of liquid used is at least the amount (weight) as the fluoropolymer to be treated, preferably the amount (weight) of liquid used is (far) greater than the amount (weight) of fluoropolymer to be treated. Preferably, the treatment composition contains one or more salts dissolved in the water phase. Preferably, the salts contain only organic cations (e.g. ammonium cations) to keep the metal content of the polymers. In another preferred embodiment, the treatment composition contains one or more mineral acid dissolved in water, e.g. HCl, $HNO_3$.

The composition containing the one or more fluoropolymer may be added to the treatment composition or, vice versa, the treatment composition may be added to the composition containing the one or more fluoropolymers. When using a fluoropolymer dispersion, the fluoropolymer may coagulate upon contact with the treatment composition. Likewise, the dispersed or suspended fluoropolymer particles may be coagulated first (for example by treatment with salts or with one or more mineral acids) and subsequently contacted with the treatment composition. The particles may also be coagulated after contact with the treatment composition, for example by coagulation steps known in the art, including subjecting the composition to high shear forces, or low temperatures or both or adding appropriate amounts salts or acids (e.g. Mg, Al salt solutions, $HNO_3$).

The treatment may be a single or a repeated treatment. After treatment with the treatment composition the particles may be separated, washed with water, dried and may be subjected to other work up steps. The treatment with the treatment composition can be carried out at room temperature and at ambient pressure but may also be carried out at increased temperature and/or at increased or reduced pressure. Preferably, contacting the fluoropolymer particles (or the composition containing them) with the treatment composition is carried out temperatures between about 15° C. and about 30° C.

Fluoropolymers

The one or more fluoropolymers for use in the present disclosure include tetrafluoroethene-based copolymers (TFE-based copolymers). They contain at least 25% by weight, preferably at least 44% by weight, of units derived from tetrafluoroethene (TFE). The fluoropolymers for use in the present disclosure include elastomeric and thermoplastic fluoropolymers.

Elastomers:

In a preferred embodiment, the fluoropolymer is a curable (cross-linkable) fluoroelastomer. It is contemplated that the method can be applied to all fluoroelastomers known in the art but, preferably, the fluoroelastomer is essentially free of ionic end groups.

By the term 'essentially free of ionic end groups' is meant that the fluoroelastomer is free of ionic end groups or contains ionic end groups in such an amount that the absorbance ratio determined by calculating the integrated peak intensity within the range of 1840 $cm^{-1}$-1620 $cm^{-1}$ to the integrated peak intensity in the range 2740 $cm^{-1}$-2220 $cm^{-1}$ in a Fourier-transform infrared spectrum of the fluoropolymer is less than 0.1. This absorbance ratio is usually used in the art to indicate the level of carboxylic end groups (U.S. Pat. No. 6,114,452) but can be used as a general measure of end groups because in the aqueous polymerization reaction carboxylic acid end groups are only formed or are formed predominantly.

Elastomers typically are amorphous. They may have a glass-transition temperature (Tg) of less than 26° C., or less than 20° C., or less than 0° C. For example, the fluoroelastomers for use in the present disclosure may have a Tg within the range of from about −160° C. to about +19° C., for example a Tg between −40° C. and up to 12° C., or between −50° C. and +15° C., or between −55° C. and +19° C. In some embodiments, the fluoroelastomers have a glass-transition temperature between −160° C. and −40° C. The fluoroelastomers may typically have a Mooney viscosity (ML 1+10 at 121° C.) of from about 2 to about 150, for example from 10 to 100, or from 20 to 70. The curable fluoropolymers may typically have an onset of cure (Ts2) of less than 1 minute at 180° C.

The elastomers are typically prepared by an aqueous emulsion polymerization. Preferably the elastomer is prepared by polymerization of tetrafluoroethene (TFE) with one or more perfluorinated unsaturated ethers and mixtures thereof and, optionally, one or more cure-site monomers selected from monomers, preferably fluorinated or perfluorinated monomers, having one or more iodine atoms or one or more nitrile groups. The elastomers may further comprise units derived from optional unsaturated olefinic comonomers, referred to herein as "optional comonomers". Examples for such optional comonomers include fluorinated monomers selected from perfluorinated $C_3$-$C_8$ olefins, in particular, hexafluoropropene (HFP). Examples of partially fluorinated comonomers include vinylidene fluoride (VDF), vinyl fluoride (VF), chlorotrifluoroethene (CTFE). Examples of non-fluorinated comonomers include ethene (E) and propene (P). Examples of perfluorinated unsaturated ether monomers that may be used include those corresponding to the formula (I):

$$CF_2=CF-(CF_2)_n-O-Rf \qquad (I)$$

wherein Rf represents a perfluorinated aliphatic group that may contain one or more oxygen atoms and n is either 0 or 1. In case n is 0 the ethers are referred to as vinyl ethers (perfluorinated alkyl vinyl ethers or PAVEs). When n is 1 the ethers are referred to as allyl ethers (perfluorinated alkyl allyl ethers or PAAEs). Preferably, Rf corresponds to

$$(R'fO)_n(R''fO)_mR'''f \qquad (II)$$

wherein R'f and R''f are different linear or branched perfluoroalkylene groups of 2-6 carbon atoms, m and n are independently 0-10, and R'''f is a perfluoroalkyl group of 1-6 carbon atoms.

While the methods described herein may be used for any elastomers, they may be most useful for elastomers containing perfluoro vinyl ether comonomer units, i.e. ethers according to formula (I) with n being 0, and in particular those where the residue Rf has 1, more than 1, preferably more than 2 carbon atoms, i.e. at least 3 carbon atoms, and in particular contains a propyl residue or one or more propylene units, preferably in vicinity to the ether oxygen. Particular examples include but are not limited to perfluoro (2-propoxypropyl vinyl) ether (PPVE-2), perfluoro(methyl vinyl) ether (PMVE), perfluoro(3-methoxy-n-propyl vinyl) ether, perfluoro(ethyl vinyl ether) (PEVE), perfluoro(2-methoxy-ethyl vinyl) ether, perfluoro(n-propyl vinyl) ether (PPVE-1) and $F_3C-(CF_2)_2-O-CF(CF_3)-CF_2-O-CF(CF_3)-CF_2-O-CF=CF_2$.

In a preferred embodiment the fluoropolymer is a curable fluoroelastomer containing one or more cure-sites containing nitrile groups and/or iodine or bromine groups and wherein the fluoroelastomer further contains units derived from one or more unsaturated perfluorinated ethers selected from the general formula:

$$Rf-O-CF=CF_2 \qquad (III)$$

wherein Rf represents a perfluoroalkyl residue containing 1, 2 or at least 3 carbon atoms which may be interrupted once or more than once by an oxygen atom. Therefore, in a preferred embodiment the fluoroelastomers contain units derived from TFE and one or more of the following comonomers: perfluoro(2-propoxypropyl vinyl) ether (PPVE-2), perfluoro(methyl vinyl) ether (PMVE), perfluoro(3-methoxy-n-propyl vinyl) ether, perfluoro(ethyl vinyl ether) (PEVE), perfluoro(2-methoxy-ethyl vinyl) ether, perfluoro (n-propyl vinyl) ether (PPVE-1) and $F_3C-(CF_2)_2-O-CF(CF_3)-CF_2-O-CF(CF_3)-CF_2-O-CF=CF_2$ and combinations thereof. Further examples of suitable unsaturated ethers include but are not limited to the vinyl ethers described in European patent application EP 1,997,795 B1.

Preferably, the molar ratio of units derived from TFE comonomer units to comonomer units derived from the unsaturated ethers corresponding to formula (I) described above may be, for example, from 1:1 to 4:1, wherein the unsaturated ethers may be used as single compounds or as combinations of two or more of the unsaturated ethers. Typical compositions comprise from 44-62 wt. % TFE and 38-56 wt. % PMVE and from 0-10% wt. bromine, iodine and/or nitrile functionalities containing cure site monomers and from 0-10% wt. of other comonomers or modifiers with the amount of ingredients being selected such that the total amount is 100% wt. Other typical compositions comprise from about 22-30 wt. % TFE, 30-38 wt. % VDF, 34-42 wt. % HFP and from 0-10% wt. bromine, iodine and/or nitrile functionalities containing cure site monomers and from 0-10% wt. of other comonomers or modifiers with the amount of ingredients being selected such that the total amount is 100% wt.

Preferably the elastomers are copolymers and comprise predominantly or exclusively repeating units derived from TFE and the above unsaturated ether comonomers or other comonomers, and optionally units derived from the optional comonomers as described above, and/or cure site comonomers as will be described below.

In one embodiment the polymerization is initiated with an initiator system selected from a combination of a fluoroaliphatic sulfinate and an oxidizing agent capable of oxidizing the sulfinate to a sulfonyl radical and/or a combination of a free radical initiator and a chloride salt. The resulting fluoropolymer is essentially free of ionic end groups. Example of oxidizing agents include free radical initiators, e.g. a persulfate, a permanganic acid or a salt thereof such as potassium permanganate. Chloride salt such as a chloride salt of the formula: M'Cl, wherein M' represents a mono- or multi-valent cation and n corresponds to the valence of the cation. Suitable cations M' include organic and inorganic cations, preferably ammonium. Examples of ammonium chloride salts include tetraalkyl ammonium chlorides such as tetrabutyl ammonium chloride as well as $NH_4Cl$. Generally, by increasing the amount of chloride salt, the number of ionic end groups reduces. Generally, the amount of chloride salt is selected such that the molar ratio of chloride ions to initiator (e.g. permanganate) is between 1:0.1 and 0.1:10, preferably between 1:0.5 and 0.1:5.

An alternative method to obtain a fluoropolymer essentially free of ionic end groups involves the use of a combination of a fluoroaliphatic sulfinate, preferably a perfluoroaliphatic sulfinate and an oxidizing agent capable of oxidizing the sulfinate to a sulfonyl radical as disclosed in U.S. Pat. No. 5,285,002. Suitable oxidizing agents include for example a persulfate such as ammonium persulfate.

The fluoroaliphatic sulfinate typically will correspond to the following formula: $R_fSO_2M$. wherein $R_f$ represents a monovalent fluoroaliphatic radical having, for example, from 1 to 20 carbon atoms, preferably 4 to 10 carbon atoms, M represents a hydrogen atom or cation with valence x, which is 1 to 2, and is preferably 1. Examples of cations include ammonium, sodium and potassium cations.

Other methods of producing fluoropolymers may be used, for example those without using any fluorinated emulsifiers and without fluorinated sulfinates, for example those described in European Patent Application No EP 2 601 226 A1 or polymerizations with organic peroxides as known in the art, for example using ammonium peroxodisulfates or combinations of organic and inorganic oxidizing agents.

The amount of initiator employed in an aqueous emulsion polymerization is typically between 0.01 and 2% by weight, preferably between 0.03 and 1% by weight based on the total weight of the polymerization mixture. The full amount of initiator may be added at the start of the polymerization or the initiator can be added to the polymerization in a continuous way during the polymerization until a conversion of 70 to 80% is achieved. One can also add part of the initiator at the start and the remainder in one or separate additional portions during the polymerization.

Additionally, to generate polymers with a low amount of ionic endgroups, perfluoro peresters can be used as initiators.

The aqueous emulsion polymerization process is generally conducted in the commonly known manner. Preferred polymerization temperatures are 10° C. to 100° C., preferably 30° C. to 80° C. and a pressure of 4 to 30 bar, in particular 6 to 18 bar.

The aqueous emulsion polymerization system may further comprise other materials, such as buffers and, if desired, complex-formers or chain-transfer agents. The aqueous emulsion polymerization may also include a fluorinated surfactant. Preferably, no perfluoroalkanoic acid or salt thereof is used, but one or more "alternative fluorinated emulsifiers" as will be described in greater detail below, may be used. Typically, the total amount of alternative fluorinated emulsifiers used in the aqueous emulsion polymerization may be between 0.1% by weight and 5% by weight based on the weight of fluoropolymer to be produced.

In order to introduce cure sites to allow for cross-linking (curing) of the polymer along the chain, the copolymerization of the basic monomers of the fluoropolymer may be carried out with one or more cure-site monomer (see for instance U.S. Pat. Nos. 4,745,165; 4,831,085 and 4,214,060). The cure sites react with a curing agent or a curing system by which the polymers are cross-linked (cured). Such curing agents or curing systems are well known in the art. The curable elastomers may, for example, be peroxide curable and contain cure sites that are reactive to a peroxide curing system. The cure sites may be introduced into the polymer by using cure site monomers, i.e. functional monomers as will be described below, functional chain-transfer agents and starter molecules. Instead or in addition to peroxide-curable cure sites, the fluoroelastomers may contain cure sites that are reactive to other curing systems. An example widely used in the art include cure sites containing nitrile or nitrile groups. Such cure sites are reactive, for example, to curing systems that generate ammonia, as well as peroxide curing agents.

Suitable cure sites for a peroxide cure system comprise iodine atoms. Iodine-containing cure site end groups can be introduced by using an iodine-containing chain transfer agent in the polymerization. Iodine-containing chain transfer agents will be described below in greater detail. In addition, halogenated redox systems as described below may be used to introduce iodine end groups.

The curable fluoroelastomers may also contain cure sites in the back bone or as pending groups in addition or as an alternative to the cure sites at a terminal position. Cure sites within the polymer backbone can be introduced by using a suitable cure-site monomer. Cure site monomers are monomers containing one or more functional groups that can act as cure sites or, less preferred, contain a precursor that can be converted into a cure site.

In addition to iodine cure sites, other cure sites may also be present, for example Br-containing cure sites or cure sites containing one or more nitrile groups. Br-containing cure sites may be introduced by Br-containing cure-site monomers. Nitrile-containing cure sites are typically introduced by cure site monomers containing a nitrile group.

Examples of cure-site comonomers include for instance:
(a) bromo- or iodo-(per)fluoroalkyl (per)fluorovinyl ethers, for example including those having the formula:

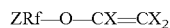

wherein each X may be the same or different and represents H or F, Z is Br or I, Rf is a C1-C12 (per)fluoroalkylene, optionally containing chlorine and/or ether oxygen atoms. Suitable examples include $ZCF_2$—O—$CF=CF_2$, $ZCF_2CF_2$—O—$CF=CF_2$, $ZCF_2CF_2CF_2$—O—$CF=CF_2$, $CF_3CFZCF_2$—O—$CF=CF_2$ or $ZCF_2CF_2$—O—$CF_2CF_2CF_2$—O—$CF=CF_2$ wherein Z represents Br or I; and (e.g. $CF_2=CF$—O—$(CF_2)_n$—O—$CF_2$—$CF_2I$).

(b) bromo- or iodo-perfluoroolefins such as those having the formula:

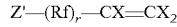

wherein each X independently represents H or F, Z' is Br or I, Rf is a $C_1$-$C_{12}$ perfluoroalkylene, optionally containing chlorine atoms and r is 0 or 1; and (c) non-fluorinated bromo and iodo-olefins such as vinyl bromide, vinyl iodide, 4-bromo-1-butene and 4-iodo-1-butene.

Specific examples include but are not limited to compounds according to (b) wherein X is H, for example compounds with X being H and Rf being a C1 to C3 perfluoroalkylene. Particular examples include: bromo- or iodo-trifluoroethene, 4-bromo-perfluorobut-1-ene, 4-iodo-perfluorobut-1-ene, or bromo- or iodo-fluoroolefins such as 1-iodo-2,2-difluroroethene, 1-bromo-2,2-difluoroethene, 4-iodo-3,3,4,4-tetrafluorobut-1-ene and 4-bromo-3,3,4,4-tetrafluorobut-1-ene; 6-iodo-3,3,4,4,5,5,6,6-octafluorohex-1-ene.

Typically, the amount of iodine or bromine or their combination in the fluoropolymer is between 0.001 and 5%, preferably between 0.01 and 2.5%, or 0.1 to 1% or 0.2 to 0.6% by weight with respect to the total weight of the fluoropolymer. In one embodiment the curable fluoropolymers contain between 0.001 and 5%, preferably between 0.01 and 2.5%, or between 0.1 and 1%, more preferably between 0.2 and 0.6% by weight of iodine based on the total weight of the fluoropolymer.

In addition to the I- and/or Br-cure sites described above, or as an alternative, the curable fluoropolymers may contain nitrile-containing cure sites. Nitrile-containing cure sites may be reactive to other cure systems for example, but not limited to, bisphenol curing systems, peroxide curing systems or triazine curing systems. Examples of nitrile containing cure site monomers correspond to the following formulae:

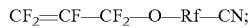

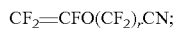

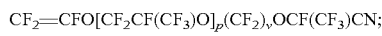

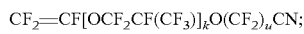

wherein, r represents an integer of 2 to 12; p represents an integer of 0 to 4; k represents 1 or 2; v represents an integer of 0 to 6; u represents an integer of 1 to 6, Rf is a perfluoroalkylene or a bivalent perfluoroether group. Specific examples of nitrile containing fluorinated monomers include but are not limited to perfluoro(8-cyano-5-methyl-3,6-dioxa-1-octene), $CF_2=CFO(CF_2)_5CN$, and $CF_2=CFO(CF_2)_3OCF(CF_3)CN$.

The amount of units derived from cure site comonomers depends on the desired cross-linking density. Cure site monomers may be used in amounts of 0 to 10% by weight, typically in amounts of less than 10% by weight or even less than 5% by weight based on the total amount of comonomers used.

The fluoroelastomers may also be of dual cure type. They may also contain different cure sites that are reactive to different curing systems.

By using halogenated chain-transfer agents terminal cure sites may be introduced. Chain-transfer agents are compounds capable of reacting with the propagating polymer chain and terminating the chain propagation. Examples of chain-transfer agents reported for the production of fluoroelastomers include those having the formula $RI_x$, wherein R is an x-valent fluoroalkyl or fluoroalkylene radical having from 1 to 12 carbon atoms, which, may be interrupted by one or more ether oxygens and may also contain chlorine and/or bromine atoms. R may be Rf and Rf may be an x-valent (per)fluoroalkyl or (per)fluoroalkylene radical that may be interrupted once or more than once by an ether oxygen. Examples include alpha-omega diiodo alkanes, alpha-omega diiodo fluoroalkanes, and alpha-omega diiodoperfluoroalkanes, which may contain one or more catenary ether oxygens. "Alpha-omega" denotes that the iodine atoms are at the terminal positions of the molecules. Such compounds may be represented by the general formula X—R—Y with X and Y being I and R being as described above. Specific examples include di-iodomethane, alpha-omega (or 1,4-)diiodobutane, alpha-omega (or 1,3-)diiodopropane, alpha-omega (or 1,5-)diiodopentane, alpha-omega (or 1,6-)diiodohexane and 1,2-diiodoperfluoroethane. Other examples include fluorinated di-iodo ether compounds of the following formula:

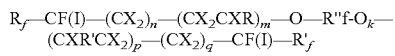

wherein X is independently selected from F, H, and Cl; $R_f$ and $R'_f$ are independently selected from F and a monovalent perfluoroalkane having 1-3 carbons; R is F, or a partially fluorinated or perfluorinated alkane comprising 1-3 carbons; $R''_f$ is a divalent fluoroalkylene having 1-5 carbons or a divalent fluorinated alkylene ether having 1-8 carbons and at least one ether linkage;

k is 0 or 1; and n, m, and p are independently selected from an integer from 0-5, wherein, n plus m at least 1 and p plus q are at least 1.

At the end of the aqueous emulsion polymerization process, an aqueous dispersion of the fluoropolymer is obtained. Usually, the average particle diameter as determined by dynamic light scattering methods is not more than 400 nm, typically in the range of 10 to 400 nm, preferably 40 to 250 nm.

Thermoplastic Fluoropolymers:

In another embodiment the fluoropolymers are selected from thermoplastic fluoropolymers having a melting point of less than 150° C. The low melting thermoplastic fluoropolymers may have a melt-flow index under a 5 kg load at 265° C. (MFI 265/5) of from about 3 to 70 g/10 mins.

The polymers may have the same comonomers as described above for the elastomers (except that they do not contain cure-site monomers) but may contain these comonomers, and optional comonomers, in amounts and ratios that result in a crystalline, thermoplastic polymer. Such amounts and ratios are known in the art. Typically, the polymers contain units derived from TFE and one or more unsaturated ether as described above in formula (I) and may also contain units derived from the optional comonomers described above, in particular units derived from HFP and/or units derived from vinylidene fluoride. In one embodiment, the fluoropolymers contain units derived from the comonomers TFE, HFP and one or more non-fluorinated comonomers like ethene and propene but no units from an unsaturated ether. In another embodiment the fluoropolymers contain units derived from the comonomers TFE, HFP and vinylidene fluoride but no units from an unsaturated ether.

In one embodiment the fluoropolymer present in the dispersion contains units derived from TFE and further contains units derived from one or more unsaturated perfluorinated ethers of formula (I) above.

In one embodiment the fluoropolymers contain units derived from the copolymers selected from TFE, HFP, and VDF and may or may not contain units derived from unsaturated ethers according to formula (I). In another embodiment, the comonomers are used to make a copolymer having repeating units derived from vinylidene fluoride, tetrafluoroethene, hexafluoropropene, and optionally an unsaturated ether according to formula (I) above, preferably a perfluoro(propyl vinyl ether) or perfluoro(methyl vinyl ether). In general, the comonomer units in the ranges of 10 mol % to 60 mol % vinylidene fluoride comonomer units, 30 mol % to 80 mol % tetrafluoroethene comonomer units, 3 mol % to 20 mol % hexafluoropropene comonomer units, and 0 mol % to 2 mol % of the one or more unsaturated ether according to formula (I), preferably a perfluoro(propyl vinyl ether), a perfluoro(ethyl vinyl ether), a perfluoro(methyl vinyl ether) or a combination thereof. In another embodiment, the fluoropolymer contains units derived from the comonomer combination comprising TFE and ethene; TFE, HFP and ethene; TFE and propene; TFE, HFP and propene; TFE, HFP, and one or more unsaturated ethers according to formula (I) above; TFE, HFP and VDF; TFE-VDF; TFE-PAVE; TFE-PAAE; and TFE-PAVE-PAAE.

Such polymers can be prepared by known method for producing fluorinated thermoplastic polymers using fluorinated emulsifiers in an aqueous radical polymerization reaction or by methods without using adding any fluorinated emulsifiers, for example, as described in international patent application No. WO2007120348 incorporated herein by reference. If fluorinated emulsifiers are used in the polymerization reaction, alternative emulsifiers are used preferably. At the end of the aqueous emulsion polymerization process, an aqueous dispersion of the fluoropolymer is obtained. Usually, the average particle diameter as determined by dynamic light scattering methods is not more than 400 nm, typically in the range of 10 to 400 nm, preferably 40 to 250 nm.

A particular advantage of the methods of the present disclosure is that it may be used as an alternative method to the anion-exchange method for removing fluorinated acids and their salts. This allows to provide fluoropolymers that are not only essentially free of fluorinated emulsifier acids and their salts but are also essentially free of non-ionic, non-fluorinated emulsifiers (i.e. contain amounts thereof of less than 2,000 ppb, preferably less than 500 ppb or even less than 50 ppb). The latter are required for the anion-exchange process.

Fluorinated Emulsifiers

With the treatment process described herein fluorinated emulsifier acids and salts can be removed. Therefore, fluoropolymers and fluoropolymer dispersions can be produced and provided that are essentially free of fluorinated emulsifier acids and salts or fluoropolymers and fluoropolymer dispersions have their content of such acids and salts reduced such they have become essentially free thereof.

The fluorinated emulsifier acid and its salts generally corresponds to the general formula:

$$Y-R_f-Z-M \tag{IV}$$

wherein Y represents hydrogen, Cl or F; $R_f$ represents a divalent linear or branched or cyclic perfluorinated or partially fluorinated saturated carbon chain typically having 4 to 18 carbon atoms wherein the carbon chain may be interrupted once or more than once by a catenary oxygen atom; Z represents an acid group. Examples of acid groups include but are not limited to —COO$^-$ and —SO$_3^-$ acid groups. M represents a cation including H$^+$. "Essentially free of fluorinated emulsifier acids and salts" means the amount of an extractable fluorinated acid or its salts is less than 5000 ppb, preferably less than 2000 ppb and more preferably less than 1000 ppb (based on the weight of the fluoropolymer). Preferably, the amount is the total amount of such acids or salts. Typically, the molecular weight of the fluorinated acid emulsifier (excluding its cation(s)), is less than 1500, 1000, or even 500 grams/mole. Fluorinated emulsifiers can be distinguished between perfluorinated alkanoic emulsifier acids and alternative emulsifiers as will be described below.

In one embodiment the fluorinated acids and their salts are perfluorinated acids and correspond to the formula:

$$F_3C-(Rf)-Z-M \tag{V}$$

wherein Rf is a perfluorinated linear, branched or cyclic saturated carbon chain (Rf is an alkanediyl group; i.e. a (CF$_{2n}$) group) containing from 4 to 17, more preferably from 5 to 12, carbon atoms and wherein the carbon chain may be interrupted once or more than once by an oxygen atom, and wherein Z represents an acid group, preferably a —COO$^-$ or a —SO$_3^-$ acid group, and M represents a cation selected from alkali metal cations, ammonium ions and H$^+$. The fluoropolymer provided or produced according to the present disclosure contains an amount of fluorinated acid or its salt of the above formula of less than 2000 ppb, preferably less than 1000 ppb and more preferably less than 100 ppb (based on the weight of the fluoropolymer). Examples include the perfluorinated alkanoic acids and their salts described below but further include, for example, CF$_3$CF$_2$OCF$_2$CF$_2$OCF$_2$COOH, CF$_3$(CF$_2$)$_6$COOH, CF$_3$O(CF$_2$)$_3$OCF(CF$_3$)COOH, CF$_3$O(CF$_2$)$_3$OCF$_2$COOH, CF$_3$(CF$_2$)$_2$(OCF(CF$_3$)CF$_2$)OCF(CF$_3$)COOH, CF$_3$(CF$_2$)$_2$(OCF$_2$CF$_2$)$_4$OCF(CF$_3$)COOH, CF$_3$CF$_2$O(CF$_2$CF$_2$O)$_3$CF$_2$COOH, and their salts.

Fluorinated emulsifiers can be distinguished between "perfluorinated alkanoic acids" and "alternative emulsifiers" as will be described below.

Perfluorinated Alkanoic Acids:

In a preferred embodiment the fluorinated acid is a perfluorinated alkanoic acid or its salt correspond to the formula (VI)

$$F_3C-(CF_2)_n-Z-M \tag{VI}$$

wherein n is an integer from 4 to 17, more preferably from 7 to 12, and wherein Z represents —COO$^-$ or —SO$_3^-$, and M represents a cation selected from alkali metal cations, ammonium ions and H$^+$. In one embodiment the fluoropolymer provided or produced according to the present disclosure contains a total amount of fluorinated acid or its salt of less than 2000 ppb, preferably less than 1000 ppb and more preferably less than 100 ppb (based on the weight of the fluoropolymer). In a preferred amount the fluoropolymer provided or produced according to the present disclosure contains a total amount of acids or salts of the above formula wherein Z represents —COO$^-$ (carboxylic acid) of less than 2000 ppb, preferably less than 1000 ppb and more preferably less than 100 ppb (based on the weight of the fluoropolymer).

In another preferred embodiment of the present disclosure the fluorinated acid or its salt is perfluorooctanoic acid and its salt. The fluoropolymer produced or provided by the present disclosure has an amount of perfluorooctanoic acid or its salts of less than 1200 ppb, preferably less than 600 ppb and more preferably less than 50 ppb and most preferably less than 25 ppb (based on the weight of the fluoropolymer) or even less than 5 ppb.

In another preferred embodiment of the present disclosure the fluorinated acid and its salts are perfluorooctanoic acid and its salts and perfluorinated C9-C14 alkanoic carboxylic acids and their salts. The fluoropolymer produced or provided by the present disclosure has a total amount of perfluorinated $C_9$-$C_{14}$ carboxylic acids (n=7-12 and Z representing a carboxylic acid group) or their salts of less than 750 ppb, preferably less than 200 ppb and more preferably less than 100 ppb (based on the weight of the fluoropolymer) and an amount of perfluorooctanoic acid or its salts of less than 1200 ppb, preferably less than 600 ppb and more preferably less than 50 ppb and most preferably less than 25 ppb (based on the weight of the fluoropolymer) or even less than 5 ppb.

In another preferred embodiment of the present disclosure the fluorinated acid is a perfluorinated alkanoic sulfonic with 4 to 14 carbon atoms (n=3-13 and Z representing a sulfonic acid group (SO$_3^-$ group) in formula (VI) above. The fluoropolymer produced or provided by the present disclosure has a total amount of perfluorinated $C_4$-$C_{14}$ sulfonic acids (n=3-13 and Z representing a sulfonic acid group (SO$_3^-$ group) or their salts of less than 750 ppb, preferably less than 200 ppb and more preferably less than 100 ppb (based on the weight of the fluoropolymer).

In a more preferred embodiment of the present disclosure the fluorinated acid is perfluorooctanoic acid or its salts, perfluorinated alkanoic acid or its salt having from 9 to 14 carbon atoms and perfluorinated alkanoic sulfonic acid with 4 to 14 carbon atoms or its salts. The fluoropolymer produced or provided by the present disclosure has a total amount of perfluorinated $C_4$-$C_8$ sulfonic acids (n=3-7 and Z representing a sulfonic acid group ($SO_3^-$ group) or their salts of less than 750 ppb, preferably less than 200 ppb and more preferably less than 100 ppb (based on the weight of the fluoropolymer), a total amount of perfluorinated alkanoic acid or its salts having from 9 to 14 carbon atoms of less than 750 ppb, preferably less than 200 ppb and more preferably less than 100 ppb (based on the weight of the fluoropolymer) and an amount of perfluorooctanoic acid or its salts of less than 1200 ppb, preferably less than 600 ppb and more preferably less than 50 ppb and most preferably less than 25 ppb (based on the weight of the fluoropolymer) or even less than 5 ppb.

Alternative Fluorinated Emulsifier Acids:

The polymers subjected to the treatment are preferably prepared without using perfluorinated alkanoic acid emulsifiers as described above to keep their content low. Instead one or more alternative fluorinated acids or their salts may be used. Therefore, the polymers may contain alternative emulsifiers. However, also the amount of alternative emulsifiers is desirably be kept low such that the compositions are essentially free of such emulsifiers. Alternative fluorinated alkanoic ether acids and salts include those that correspond to the general formula:

$$[R_f\text{—O-L-COO}^-]_i X_i^+$$

wherein L represents a linear or branched or cyclic partially fluorinated alkylene (alkanediyl) group or an aliphatic hydrocarbon group, $R_f$ represents a linear or branched, partially or fully fluorinated aliphatic group or a linear or branched partially or fully fluorinated group interrupted once or more than once by an ether oxygen atom, $X_i^+$ represents a cation having the valence i and i is 1, 2 and 3. Preferably, the molecular weight of the emulsifier is less than 1,500 g/mol. Specific examples are described in, for example, US Pat. Publ. 2007/0015937 (Hintzer et al.). Exemplary emulsifiers include: $CF_3CF_2CH_2OCF_2CH_2OCF_2COOH$ and $CF_3O(CF_2)_3OCHFCF_2COOH$, $CHF_2(CF_2)_5COOH$.

In one embodiment, the molecular weight of the emulsifier, preferably a partially fluorinated emulsifier, is less than 1500, 1000, or even 500 grams/mole. Typically, the alternative fluorinated emulsifier acids and their salts have from 4 to 19 carbon atoms, preferably from 5 to 14 or from 6 to 12 carbon atoms.

Instead of using one or more alternative emulsifiers also the use of one or more non-fluorinated emulsifiers is possible, or combination of alternative emulsifiers and non-fluorinated emulsifiers. Examples for polymerizations of fluoropolymers with non-fluorinated emulsifiers are described, for example, in U.S. patent application No. US 2007/0149733.

The alternative fluorinated emulsifier acids and their salts can also be removed by using the treatment composition as described above and by the same methods of the present disclosure as the perfluorinated alkanoic acids and fluoropolymers can be provided that are not only essentially free of one or more perfluorinated alkanoic acid but also essentially free of alternative fluorinated emulsifier acids and their salts. For example the amount of one or more alternative fluorinated emulsifier acid or its salt may be less than 5000 ppb, preferably less than 2000 ppb and more preferably less than 1000 ppb and most preferably less than 500 ppb (based on the weight of the fluoropolymer).

Removing Sulfonic Acid Emulsifiers

In case the polymerization reaction product contains both carboxylic acid and sulfonic acid emulsifiers, it may be preferred to separate the sulfonic acids by anion exchange prior to subjecting the composition to the treatment composition described herein. Unless added as such, sulfonic acid emulsifiers may be present in reaction compositions because of impurities in the starting materials or may be generated as by-products during the polymerization reaction, in particular, when sulfonates are used as starting materials. Perfluorinated alkanoic sulfonic acids and their salts include, $C_4$-$C_{13}$-perfluorinated alkanoic sulfonic acids and their salts, i.e. perfluoroalkanoic sulfonic acids with 4 to 13 carbon atoms. More preferred are $C_4$-$C_8$-perfluorinated alkanoic sulfonic acids and their salts. Such emulsifier acids correspond to formula (VI) above with Z representing a sulfonic acid group, $SO_3^-$, and n representing 3 to 12 or 3 to 7, respectively. To remove such a perfluorinated sulfonic acid or its salts the aqueous composition containing the fluoropolymers, preferably the reaction product from the polymerization reaction, is subjected to anion exchange. The anion exchange resin used in the anion exchange step preferably is a basic ion-exchange resins that has been loaded with one or more acid that bonds less strongly to the anion exchange resin than the sulfonic emulsifier acid to be removed from the composition. By bonding to the anion exchange resin, the emulsifier sulfonic acid replaces the acid that was absorbed onto the resin and releases it. Preferably, the anion exchange resin is loaded with one or more fluorinated emulsifier carboxylic acids as described above, more preferably with one or more alternative fluorinated emulsifier carboxylic acids as described above. Releasing the alternative emulsifier carboxylic acid from the resin helps to stabilize the fluoropolymer particles and avoids coagulation of the fluoropolymer particles during the anion exchange process and preferably also thereafter. Anion exchange resins can be used as known in the art for treating fluoropolymer dispersion, for example as described in EP 1 155 055 B1. Addition of non-ionic emulsifiers is not required before, during or after the anion-exchange step. Instead of fluorinated emulsifier carboxylic acids also non-fluorinated anionic emulsifiers may be used. However, the use fluorinated emulsifier carboxylic acids may be advantageous because they can be removed in a subsequent process step by subjecting the anion-exchanged composition to the treatment composition and treatment process as described herein. The concentration of the polymer compositions subjected to the anion exchange may typically be from 5-40 wt. %, preferably 15-30 wt. %. The anion exchange process can typically be run at operation temperatures from about 10° C. to about 50° C., preferably from 15° C.-35° C. The level of sulfonic acids and their salts can be reduced to below 15 ppb, preferably to below 10 ppb and more preferably below 5 ppb (based on the content of fluoropolymer).

The composition obtained from the anion exchange may then be used as starting composition to be subjected to the treatment composition as described above for removing the fluorinated emulsifiers or alternative fluorinated emulsifiers. The resulting polymers than have very low levels of fluorinated or perfluorinated carboxylic and sulfonic acids and their salts, in particular perfluorinated alkanoic sulfonic and carboxylic acids and their salts having from 4 to 14, more preferably from 4 to 8 carbon atoms, for example with total amounts of such acids and salts of less than 100 ppb or even less than 50 ppb or even less than 20 ppb (based on fluoropolymer).

Blends of Fluoroelastomer and Thermoplastic Fluoropolymer

Another advantage of the processes and compositions of the present disclosure is that blends of fluoroelastomers and fluorothermoplasts can be prepared that have a low content of fluorinated emulsifier acids. Such blends may be particularly useful for applications in the semiconductor industry because not only a low metal content is required for such applications but also desirably no acids should leak out from the fluoropolymer materials to meet the high purity requirements in semiconductor processing and production. The fluoroelastomers according to the present disclosure have very low amounts of fluorinated emulsifier acids (extractable acids) and can be blended with thermoplastic fluoropolymers to provide blends that have low amounts of fluorinated emulsifiers acids. Such blends typically contain the fluoroelastomers as elastic component and one or more thermoplastic fluoropolymer as filler that is chemically inert. The blends may be particularly useful for making seals or molds, in particular for an apparatus in the production or purification of semiconductors or products containing semiconductors. Suitable thermoplastic fluoropolymers include, for example, polytetrafluoroethene (PTFE), copolymers of tetrafluoroethene (TFE) and one or more perfluorinated alpha olefinic comonomers.

In one embodiment of the present disclosure the blend comprises one or more fluoroelastomers according to the present disclosure and one or more PTFE.

In another embodiment, the blend comprises one or more fluoroelastomers according to the present disclosure and one or more low melting thermoplastic fluoropolymer according to the present disclosure.

In one embodiment of the present disclosure the blend comprises one or more fluoroelastomers according to the present disclosure and one or more tetrafluoroethene copolymer having a melting point of from about 250° C. to about 326° C., a melt flow index (MFI at 372° C. and 5 kg load) of 0.1-50 grams/10 minutes. Preferably, the tetrafluoroethene copolymer has at least 89% by weight of units derived from tetrafluoroethene and from about 0.5 to about 6% by weight of units derived from at least one perfluorinated alkyl allyl ether (PAAE) comonomer. Preferably, the tetrafluoroethene copolymer has from 0 to 4% by weight of units derived from one or more co-polymerizable optional comonomers. The total weight of the polymer is 100% by weight. Preferably, the at least one PAAE corresponds to the general formula:

$$CF_2=CF-CF_2-O-Rf \quad (VII)$$

where $R_f$ is a perfluorinated alkyl group having from 1 to 10 carbon atoms. Such thermoplastic high melting fluoropolymers are believed to also have a low amount of extractable fluorinated emulsifier acids. The tetrafluoroethene copolymer preferably contains one or more PAAE according to the above formula wherein Rf corresponds to a perfluoroalkyl unit selected from the group consisting of perfluoromethyl ($CF_3$), perfluoroethyl ($C_2F_5$), perfluoropropyl ($C_3F_7$) and perfluorobutyl ($C_4F_9$), preferably $C_2F_5$, $C_3F_7$ or $C_4F_9$. Preferably the has a melting point of from 286° C. to 326° C. Preferably, the tetrafluoroethene copolymer has a melt flow index (MFI at 372° C. and 5 kg load) of 31 to 50 grams/10 minutes. For example, the tetrafluoroethene copolymer may have (i) from 0.5 to 4.0% by weight of units derived from the at least one PAAE comonomer if the residue Rf in the above formula (VII) is a perfluoromethyl; or (ii) from 0.5 to 5.0% by weight of units derived from the at least one PAAE comonomer if the residue Rf in the above formula (VII) is a perfluoroethyl; or (iii) from 0.5 to 6.0% by weight of units derived from the at least one PAAE comonomer if the residue Rf in the above formula (VII) is a perfluoropropyl or perfluorobutyl; or (iv) from 1.0 to 6.0% by weight of units derived from the at least one PAAE comonomer, if the residue Rf in the above formula (VII) comprises from 5 to 10 carbon atoms.

Preferably the tetrafluoroethene copolymer has no units derived from a perfluorinated alkyl vinyl ether (PAVE) comonomer. Preferably, the tetrafluoroethene copolymer has from 94 to 99% by weight units derived from tetrafluoroethene and from 1 to 5% by weight of units derived from the at least one PAAE and from up to 6% by weight, preferably up to 4.4% by weight of units derived from one or more coplymerizable optional comonomer selected from hexafluoropropene (HFP).

Preferably, the tetrafluoroethene copolymer has a total extractable amount of perfluorinated $C_6$-$C_{12}$ alkanoic carboxylic acids or its salts of less than 500 ppb based on the amount of the copolymer. Preferably, the blends have a total amount of perfluorooctanoic acid or its salts of less than 50 ppb, preferably less than 25 ppb.

The blends may typically contain the fluoroelastomer in an amount of from about 10% up to about 90% by weight based on the total weight of the blend which is 100% by weight. The blend may contain the fluorothermoplastic polymers in an amount from about 90% by weight up to 10% by weight based on the total weight of the blend which 100% by weight. In one embodiment the blends are solid particles.

In one embodiment, the blend is an aqueous dispersion. Such dispersion may contain from about 10 to 80% by weight of water and from 10% to 90% by weight of fluoroelastomers and from 10 to 90% by weight of fluorothermoplastic polymer and wherein the amounts are selected such that the total weight of the blend is 100% by weight.

The blends may be prepared in various ways. Preferably, an aqueous dispersion of fluoroelastomer particles is blended with an aqueous dispersion of thermoplastic fluoropolymer. The resulting dispersion may be coagulated, preferably by addition of one or more mineral acid as described herein, and subjected to the treatment process as described herein. Another example includes preparing the fluoroelastomer according to the present disclosure and combining the coagulated fluoroelastomer particles with an aqueous dispersion of thermoplastic fluoropolymer. A further example includes dry blending coagulated fluoroelastomer particles with particles of thermoplastic fluoropolymer.

Preferably, the fluoroelastomer and thermoplastic fluoropolymer have a particle size of from about 50-300 nm, preferably from 80-250 nm. The average particle size of the fluoroelastomer may be smaller, greater or the same as the average particle size of the thermoplastic fluoropolymer.

To further enhance the bonding between the fluoroelastomer matrix and the thermoplastic filler, the thermoplastics can be modified with Br-, I- and/or CN-containing comonomers, e.g. BTFE, iodine-/nitrile-containing olefins (vinyl/allyl ethers). The cure site monomers described herein can be used for this purpose. These modifiers are used preferably during end of the polymerization reaction, for example during the last 5-10% of the polymerization process; the overall modifier content is typically less than 1% by weight based on the weight the thermoplastic fluoropolymer. In a crosslinking reaction of the matrix, the thermoplastic material can be bonded to the fluoroelastomer material.

Methods

Glass-Transition Temperature (Tg):

Glass-transition temperatures of the polymers were determined in accordance with DIN EN ISO 11357-2:2014-07 using a Mettler-Toledo DSC 2 under nitrogen flow, heating and cooling rates of 10 K/min, and a sample amount of (10±0.5) mg. The indicated Glass-transition temperatures were determined using the half-step-height method.

Mooney Viscosity:

Mooney viscosities can be determined in accordance with ASTM D1646-07(2012), 1 minute pre-heat and a 10 minute test at 121° C. (ML 1+10@121° C.).

Melt Flow Index (MFI):

The melt-flow index (MFI), reported in g/10 min, can be measured with a Goettfert MPX 62.92 melt indexer (Buchen, Germany) according to DIN EN ISO 1133-1:2012-03 at a support weight of 5.0 kg. The MFI can be obtained with a standardized extrusion die of 2.1 mm in diameter and a length of 8.0 mm. Unless otherwise noted, a temperature of 265° C. was applied.

Melting Point

Melting points of the fluorothermoplastic polymers were determined in accordance with DIN EN ISO 11357-3:2013-04 using a Mettler-Toledo DSC 2 under nitrogen flow and heating and cooling rates of 10 K/min. The indicated melting points relate to the melting peak maximum of the second heating run of a (10±0.5) mg sample.

Particle Size

The latex particle size determination can be conducted by means of dynamic light scattering with a Malvern Zetasizer 1000HSA (Malvern, Worcestershire, UK) as described in DIN ISO 13321:2004-10.

Metal Cation Content

The cation contents of the samples were determined by ion conductive plasma (ICP) of the polymer samples. Samples were treated with $HNO_3$ followed by pyrolysis at 550° C. for 10 minutes in a sealed pyrolysis bomb before subjecting them to ICP.

Fluorinated Acid Content (Extractable Acid Content)

The amount of fluorinated emulsifier acids or salts thereof in a fluoropolymer is determined by extraction of the acids from the polymer. Therefore, the polymer sample is extracted with methanol and the content of emulsifier acids or salts thereof in the methanol extract is determined by HPLC-coupled mass spectrometry. The extraction is done by adding 3 ml methanol to 1 g fluoropolymer sample and stirring the mixture for 16 h@250 rpm and 50° C.

For a most effective extraction of fluorinated acids from solid polymer samples, the particle size of the polymer sample should be less than 250 µm. Samples with larger particles should be ground under mild conditions (e.g. by cryo milling) before the extraction. Solid samples, for example coagulated polymer, were washed 6 times with water (each washing step was carried out with at least 100 times of the volume of the samples, and then dried for 6 hours at 115° C. at reduced pressure (200 mbar) to remove the water. Samples from aqueous dispersions or latexes were freeze-dried to remove water. The particle size of the freeze-dried samples is normally below 250 µm, so an additional grinding step is usually not needed.

The fine-grained material was spiked with a methanolic surrogate recovery standard (SRS) $^{13}C_4$-PFOA (perfluorooctanoic acid having 4 of its carbon atoms replaced by $^{13}C$ isotopes) solution at a concentration of 25 ppb based on polymer mass and allowed to dry. The dried, spiked polymer material was treated with methanol (1 g polymer+3 ml methanol, 16 h@250 rpm and 50° C.) to extract fluorinated acids. The extract was centrifuged (~10 min @ 4400 rpm) and an aliquot of the supernatant was transferred into a 2 ml autosampler vial. The extract was analyzed for fluorinated acids with reversed phase HPLC coupled with a triple quadrupole mass spectrometer (e.g. Agilent 6460 or AB Sciex API 5000 QQQ-MS) in negative Multiple Reaction Mode (MRM) using analyte typical transitions, e.g. m/z 413→369 for PFOA (perfluorinated octanoic acid) or m/z 499→80 for PFOS (perfluorooctane sulfonic acid). The HPLC (Agilent 1200) was equipped with an Agilent C18 column (Zorbax Eclipse XDB-C18 4.6×50 mm 1.8 µm) and run in gradient mode with high purity water and methanol@50° C., both liquids were LC-MS grade and modified with 10 mM ammonium acetate (gradient 15% MeOH→100% MeOH). The analytes were quantified using equivalent or chromatographically similar isotope labelled internal standards (e.g. $^{13}C_8$-PFOA as internal standard for PFOA or $^{13}C_8$-PFOS as internal standard for PFOS) in a calibration range of 0.5-200 ng/ml analyte in methanolic extract, resulting in a lower level of quantification (LLOQ) related to polymer of 1.5 ppb and an upper limit of quantification (ULOQ) of 600 ppb. Analytes with concentrations higher than ULOQ were diluted with methanol into the calibration range and the analysis was repeated.

Example 1

An aqueous perfluoroelastomer-latex was used for all examples: elastomer (solid) content 29.7 wt. %; absorbance ratio of ionic end groups <0.1; average particle size of 80 nm. The elastomer had contained 65 mol % of TFE units, 33 mol % of PMVE units and 2 mol % of cure site monomers with nitrile-cure site groups. The latex was obtained by aqueous polymerization using a partially fluorinated salt of a C7-acid ($CF_3$—O—$(CF_2)_3$—O—CFH—$CF_2$—$COONH_4$) similar to the procedure described in U.S. Pat. No. 8,604,137 B2. 1 kg of the latex was added at 23° C. to 3 kg aqueous $MgCl_2$-solution (1.3 wt. % salt content) upon which the fluoroelastomer coagulated. After coagulation 300 g of gasoline (SHELLSOL 80/110) were added to the slurry and agitated for 0.5 h. The solids were collected and washed 5 times with $H_2O$ (1 L) and dried at 115° C. for 16 h in an oven. Samples of the dried elastomer were cryo-milled and analyzed for PFAAs as described in the method description above. The amount of perfluorinated C8 acid was 1150 ppb and the total amount of perfluorinated C9 to C14 acid ($\Sigma(C_9$-$C_{14}$)) was 1680 ppb.

Example 2

500 g of the perfluoroelastomer latex were added to a mixture of 1.5 L of aqueous $MgCl_2$-solution (1.3 wt. % salt content) and 150 g gasoline (SHELLSOL 80/110) over 15 minutes and the slurry was agitated for 0.5 h. After washing the coagulated material 5 times with water and drying at 115° C. for 1 h the following PFAA-results were found: $C_8$ acids=500 ppb, $\Sigma(C_9$-$C_{14})$ acids=180 ppb. Li, Na, K, Ca, Mg, Ba, Al-content: 145 ppm Example 3

500 g of the Perfluoroelastomer-latex were added to a mixture of 1.5 kg 3.5 wt. % $HNO_3$-solution ($\triangleq$80 g $HNO_3$ 65% in 1 L water) and 150 g gasoline (SHELLSOL 80/110). After following the same procedure as described in example 2, the PFAA-results were: $C_8$ acid=9 ppb, $\Sigma(C_9-C_{14})$ acids=82 ppb. Li, Na, K, Ca, Mg, Ba, Al-content: 1.3 ppm Comparative Example 1

1 kg of the elastomer latex was added at 23° C. to 3 kg of an aqueous $MgCl_2$-solution (1.3 wt. % of salt). The solids were removed and washed 5 times with $H_2O$ (1 L) dried at 115° C. for 16 h in an oven. Samples of the dried elastomer were cryo-milled and analyzed for PFAAs: $C_8$ acid=15040 ppb; $\Sigma(C_9-C_{14})$ acids=2373 ppb. Li, Na, K, Ca, Mg, Ba, Al-content: 117 ppm.

Example 4

A latex containing a TFE-PMVE perfluoroelastomer with nitrile cure sites was obtained by aqueous emulsion polymerization generally as described in U.S. Pat. No. 8,604,137. The latex contained 55 ppm of $C_4-C_8$ sulfonic acids. The latex was diluted with water to a solid content of 20% and subjected to ion-exchange (AMBERJET 4200 resin loaded with an alternative partially fluorinated emulsifier; two anion exchange columns of 4L volume where run subsequently at a rate of 6-8 L latex/h). To isolate the elastomer the latex obtained from the anion exchange was coagulated with a 5 wt % aqueous solution of $HNO_3$. The coagulated polymer was washed 6 times with water and then dried at 115° C. and 200 mbar reduced pressure. The isolated elastomer had a total content of $C_4-C_8$ sulfonic acids of below 5 ppb (based on fluoropolymer content). The isolated polymer can be used as elastomer in elastomer applications. The latex obtained from the anion-exchange step can be used to isolate the elastomers as described above or it can be subjected to the treatment composition according to the present disclosure to further remove fluorinated emulsifier.

The invention claimed is:

1. A method for reducing the amount of a fluorinated acid or its salts from a fluoropolymer, the method comprises
    (i) providing a composition containing particles of the fluoropolymer, and
    (ii) contacting the fluoropolymer particles with a treatment composition comprising at least one organic liquid, wherein the organic liquid is immiscible with water at ambient conditions and the composition containing the fluoropolymer comprises a coagulated fluoropolymer;
    and wherein the fluoropolymer contains units derived from tetrafluoroethene (TFE) and is fluoroelastomer or has a melting point of less than 150° C.

2. The method of claim 1 wherein the composition containing the fluoropolymer is the reaction product of a polymerization reaction to produce the fluoropolymer.

3. The method of claim 1 further comprising (iii) isolating, washing and subjecting the fluoropolymer to drying treatment.

4. The method of claim 1 wherein the fluorinated acid and its salts corresponds to the general formula:

$$Y-R_f-Z-M$$

wherein Y represents hydrogen, Cl or F; $R_f$ represents a divalent linear or branched or cyclic perfluorinated or partially fluorinated saturated carbon chain having 4 to 18 carbon atoms; Z represents an acid group, for example a $-COO^-$ or a $-SO_3^-$ acid group, and M represents a cation.

5. The method of claim 1 wherein the fluorinated acid is a perfluorooctanoic acid or its salt and wherein its amount is reduced to, less than 25 ppb, based on the weight of the fluoropolymer.

6. The method of claim 1 wherein the composition is an aqueous dispersion and the process comprises (iv) reducing the pH of the aqueous composition by adding one or more mineral acids and wherein (iv) is carried out prior to and/or simultaneous with (ii).

7. The method of claim 1 wherein the composition is an aqueous dispersion and the process further comprises (v) coagulating the fluoropolymer and wherein (v) is carried out prior to (ii) or simultaneously with (ii).

8. The method of claim 1 wherein the extractable fluorinated acid is a perfluorinated acid selected from $C_9-C_{14}$ alkanoic carboxylic acids and wherein the total amount of these acids is reduced to less than 100 ppb, based on the weight of the fluoropolymer.

9. The method of claim 1 wherein the fluoropolymer contains units derived from one or more comonomers selected from unsaturated perfluorinated ethers according to the general formula:

$$R_f-O-(CF_2)_n-CF=CF_2$$

wherein n is 1 (allyl ether) or 0 (vinyl ether), and Rf represents a linear or branched perfluoroalkyl residue containing from 1 to 10 carbon atoms which may be interrupted once or more than once by an oxygen atom.

10. The method of claim 1 wherein the fluoropolymer is a curable fluoroelastomer and is essentially free of ionic end groups and contains ionic end groups in such an amount that the absorbance ratio determined by calculating the integrated peak intensity within the range of 1840 $cm^{-1}$-1620 $cm^{-1}$ to the integrated peak intensity in the range 2740 $cm^{-1}$-2220 $cm^{-1}$ in a Fourier-transform infrared spectrum of the polymer, is less than 0.1.

11. The method of claim 1 wherein the fluoropolymer is a fluoroelastomer and the organic liquid has a boiling point of from 30 to 200° C.

12. The method of claim 1 wherein the organic liquid is a hydrocarbon that may, optionally, contain one or more functional groups selected from halogen atoms, ether groups, carboxylate ester groups, phosphoric acid ester groups, phosphonic acid ester groups, sulfonic acid ester groups, sulfuric acid ester groups, nitrile groups, ketone groups, carbon-carbon double bonds, carbon-carbon triple bonds, hydroxy groups, nitrogen-containing functional groups other than nitrile groups, sulfoxide groups, anhydride groups and combinations thereof.

13. The method of claim 1 wherein the composition containing particles of the fluoropolymer has been obtained by subjecting an aqueous dispersion of the fluoropolymer to anion exchange with an anion exchange resin to remove fluorinated sulfonic acids and wherein the anion exchange resin has been loaded with one or more fluorinated acid corresponding to the general formula:

$$[R_f-O-L-COO-]_iX^{i+}$$

wherein L represents a linear or branched or cyclic partially fluorinated alkylene (alkanediyl) group or an aliphatic hydrocarbon group, $R_f$ represents a linear or branched, partially or fully fluorinated aliphatic group or a linear or branched partially or fully fluorinated group interrupted once or more than once by an ether oxygen atom, $X^{i+}$ represents a cation having the valence i and i is 1, 2 and 3.

14. A fluoropolymer made by the method of claim 1, the fluoropolymer having an amount of an extractable fluorinated acid and its salt of less than 100 ppb, based on the weight of the fluoropolymer, wherein the fluorinated acid corresponds to the general formula:

Y—R$_f$—Z-M wherein Y represents hydrogen, Cl or F; R$_f$ represents a divalent linear or branched or cyclic perfluorinated or partially fluorinated saturated carbon chain having 4 to 18 carbon atoms; Z represents an acid group, for example a —COO$^-$ or a —SO$_3^-$ acid group, and M represents a cation.

15. The fluoropolymer of claim 14 having a total amount of perfluorinated alkanoic sulfonic acids having 4 to 8 carbon atoms or its salts of less than 5 ppb, based on the weight of the fluoropolymer.

16. The method of claim 1 wherein the fluoropolymer has a melting point of less 150° C. and the organic liquid has a boiling point of from 30 to below the melting point of the fluoropolymer.

17. The method of claim 4, wherein the cation is H$^+$.

18. The fluoropolymer of claim 15, wherein the cation is H$^+$.

* * * * *